(12) United States Patent
Igarashi

(10) Patent No.: US 6,895,250 B1
(45) Date of Patent: May 17, 2005

(54) METHOD AND RELAY STATION FOR CALLBACK COMMUNICATION

(75) Inventor: Chiaki Igarashi, Tokyo (JP)

(73) Assignee: NEC Corporation, Tokyo (JP)

(*) Notice: Subject to any disclaimer, the term of this patent is extended or adjusted under 35 U.S.C. 154(b) by 423 days.

(21) Appl. No.: 09/710,267

(22) Filed: Nov. 10, 2000

(30) Foreign Application Priority Data

Nov. 12, 1999 (JP) ............................................ 11-322780

(51) Int. Cl.$^7$ ................................................ H04Q 7/00
(52) U.S. Cl. .................... 455/459; 455/414.1; 455/445; 379/209.01
(58) Field of Search ................................ 455/408, 406, 455/414.1, 424, 425, 404.2, 407, 412.1, 414.2, 458, 426.1, 428, 445; 379/210.01, 209.01

(56) References Cited

U.S. PATENT DOCUMENTS

| | | | |
|---|---|---|---|
| 5,406,616 A | * | 4/1995 | Bjorndahl ................. 455/414.1 |
| 5,761,289 A | * | 6/1998 | Keshav ................... 379/210.01 |
| 6,477,364 B1 | * | 11/2002 | Otake ...................... 455/414.1 |
| 6,501,837 B1 | * | 12/2002 | Adler et al. ........... 379/210.01 |
| 6,556,816 B1 | * | 4/2003 | Gafrick et al. .............. 455/422 |

FOREIGN PATENT DOCUMENTS

| | | |
|---|---|---|
| EP | 0 690 365 A1 | 1/1996 |
| JP | 9-154174 | 6/1997 |
| WO | WO 99/08434 | 2/1999 |

* cited by examiner

*Primary Examiner*—David Hudspeth
*Assistant Examiner*—Kamran Afshar
(74) *Attorney, Agent, or Firm*—Scully, Scott, Murphy & Presser (57) ABSTRACT

In a method of establishing callback communication between first and second terminals via a relay station, the first terminal sends a callback request for establishing the callback communication to the second terminal. The method comprises the steps of: (1) establishing first connection between the first terminal and the relay station; (2) sending the callback request from the first terminal to the relay station; (3) establishing second connection between the second terminal and the relay station with the first connection being kept established in response to a request from the second terminal; and (4) linking the first connection with the second connection in order to establish the callback communication between the first and second terminals. Further, a relay station performing the method is also provided. This method dispenses with any identifier for identifying the first terminal on performing the callback.

14 Claims, 10 Drawing Sheets

Fig. 1

*Related Art*

METHOD AND RELAY STATION FOR CALLBACK COMMUNICATION

BACKGROUND OF THE INVENTION

1. Field of the Invention

The present invention relates to a callback mechanism between two telecommunication terminals one of which is a wireless telephone and, more particularly, to data communication between a data server in a local area network and a wireless telephone which can not autonomously accept a call for establishing callback connection.

2. Description of the Related Art

There is a system for callback communication between a wireless telephone and a data server. The wireless telephone, which is provided as terminal equipment of digital cordless telecommunication system, PDC (personal digital cellular telecommunication system) or the like, sends a request for data to the data server. The data server calls the wireless telephone to send the requested data to the wireless telephone. In order to receive the data, the wireless telephone should accept the call autonomously.

For example, there is a PBX (private branch exchange) system to which PHS (personal handy phone system) is applied. In the PBX system, a TA (terminal adapter) is installed at an output point (T point) of a DSU (digital service unit) connected with ISDN (integrated services digital network). At output R points of the TA, a base station and other data terminals are connected with the TA. The base station is connected with terminals by a wireless path or channel. With this structure, the terminals are put into a state of accepting callback from the base station autonomously.

General wireless telephones, however, are not always installed with a function for accepting callback. If a wireless telephone without such a function is used as a terminal of the above-mentioned PBX system, the wireless telephone cannot accept callback from the data server.

Moreover, when the terminal is not given an identifier for specifying each of the terminals connected with the base station, the base station cannot select one of the terminals for sending callback so that the terminal can not receive the callback, even if the terminal is available for callback.

Figure 1:
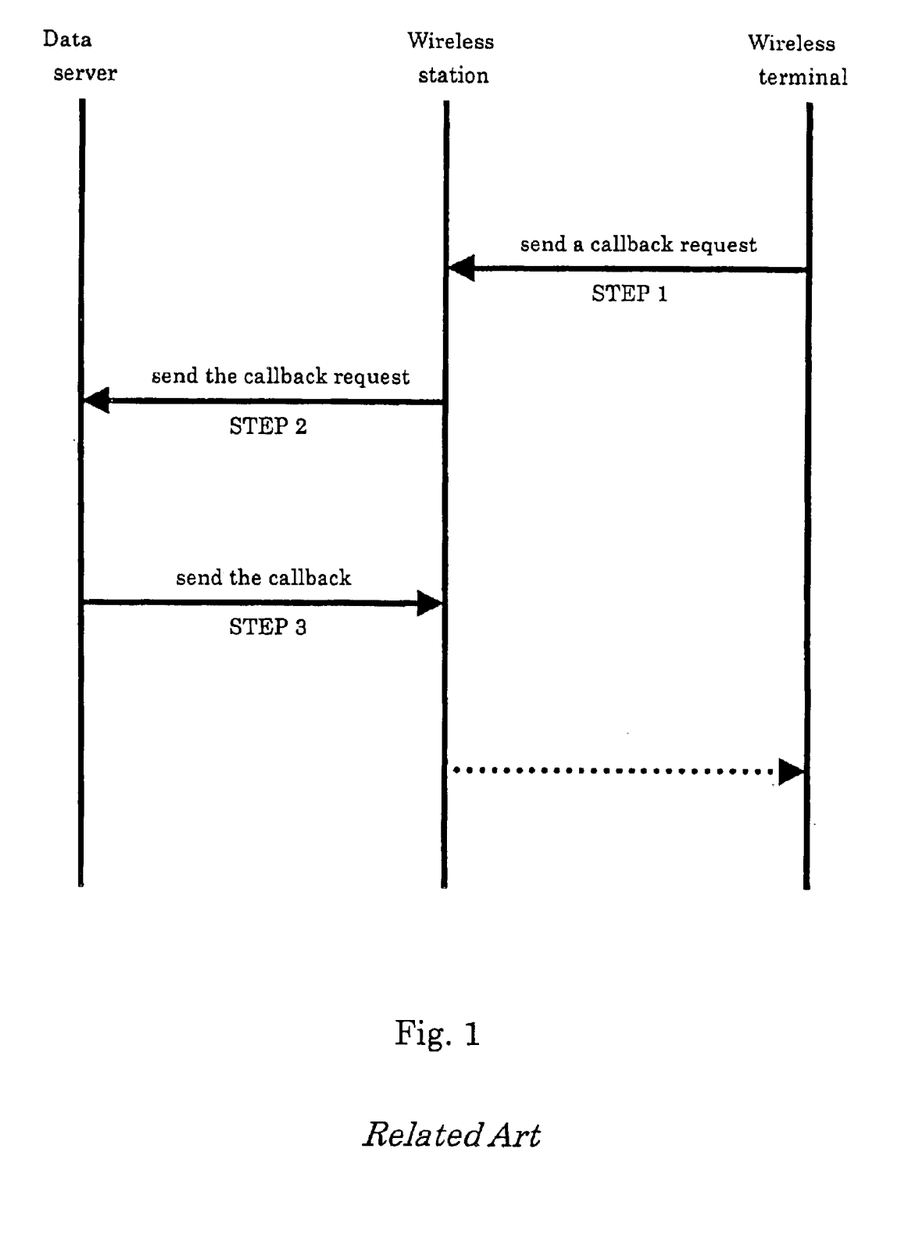
FIG. 1 shows a sequence of conventional callback communication between a data server and a wireless terminal via a base station.

Description will be made about a callback communication procedure of a practical wireless PBX system whose terminals are not given their identifiers with reference to FIG. 1. The system comprises a data server, a base station and plural wireless terminals. First, one of the terminals sends a request for callback to the base station by wireless path (STEP 1). Next, the base station sends the request to the data server by a wired line (STEP 2). The request of STEP 2 includes a telephone number of the base station, but does not include the identifier of the terminal. Consequently, even if the data server sends callback back to the base station (STEP 3), the base station cannot relay the callback to the terminal.

SUMMARY OF THE INVENTION

Thus, in order to accept and respond to callback by a wireless terminal, a function for accepting callback should be incorporated in the wireless terminal. Namely, conventional callback communication between a wireless terminal and a data server requires a wireless terminal comprising a function for callback but such functions may not be always incorporated into all of common wireless terminals.

When the user of the wireless terminal does not know that his or her terminal is unavailable for callback, he or her might try callback communication repeatedly. As a result, the lines of the data server and wireless paths between the base station and the wireless terminals would be busy frequently.

Moreover, the conventional base station must secure wireless line for the wireless terminal requesting callback, so that base station must execute complex connection control between the public telecommunication network and the wireless terminals.

It is an object of this invention to provide a method, system and base station for callback communication requested by a terminal without a function for replying to callback.

It is another object of this invention to provide the method, system and base station, wherein wireless paths are undesirably frequently kept busy between the base station and the terminal or the data server.

It is still another object of this invention to provide the method, system and base station, wherein connection control by the base station is simplified.

According to the present invention, a method is for use in establishing callback communication between first and second terminals via a relay station. In the method, the first terminal sends a callback request for establishing the callback communication to the second terminal. The method comprises the steps of: (1) establishing first connection between the first terminal and the relay station; (2) sending the callback request from the first terminal to the relay station; (3) establishing second connection between the second terminal and the relay station with the first connection being kept established in response to a request from the second terminal; and (4) linking the first connection with the second connection in order to establish the callback communication between the first and second terminals.

The relay station may comprise wireless and wired communication interfaces. In this case, the wireless communication interface is connected with at least one of the first and second terminals.

The step (3) may comprise the steps of: establishing the second connection requested by the relay station; sending the callback request from the relay station to the second terminal; canceling the second connection; and establishing the second connection requested by the second terminal. In this case, both the relay station and the second terminal may request the step of canceling.

When the relay station comprises wireless and wired communication interfaces and the wireless communication interface is connected with at least one of the first and second terminals, the first terminal may be connected with the relay station via the wireless communication interface and the second terminal may be connected with the relay station via the public telecommunication network. Alternatively, the first terminal may be connected with the relay station via the public telecommunication network and the second terminal may be connected with the relay station via the wireless communication interface.

Furthermore, according to the present invention, a relay station is for use in establishing callback communication between first and second terminals, the first terminal sending a callback request for establishing the callback communication to the second terminal. The relay station comprises: first interface for establishing first connection with the first terminal and receiving the callback request from the first terminal; second interface for establishing second connection with the second terminal with the first connection being kept established in response to a request from the second terminal; and means for linking the first connection with the second connection in order to establish the callback communication between the first and second terminals.

The relay station may comprise wireless and wired communication interface and the wireless communication interface may be connected with at least one of the first and second terminals.

The second interface may comprise means for canceling the second connection from sending the callback request to the second terminal to receiving a request for reestablishing the second connection from the second terminal. In this case, the means for canceling may cancel the second connection without waiting for a request from the second terminal. Alternatively, the means for canceling may cancel the second connection in response to a request from the second terminal.

When the relay station comprises wireless and wired communication interface and the wireless communication interface is connected with at least one of the first and second terminals, the first terminal may be connected with the relay station via the wireless communication interface and the second terminal may be connected with the relay station via the public telecommunication network. Alternatively, the first terminal may be connected with the relay station via the public telecommunication network and the second terminal may be connected with the relay station via the wireless communication interface.

DESCRIPTION OF THE PREFERRED EMBODIMENTS

Description will be made about a callback communication system 100 with reference to FIG. 2. In the system 100, a PHS (personal handy phone system) private branch exchange system 1 (hereinafter referred to as the PBX system 10) is connected with a data server 3 via an ISDN (integrated services digital network) 2.

The PBX system 1 comprises a DSU (digital service unit) 11, a TA (terminal adapter) 12, a wireless station 13 (may be called a base station), and a wireless terminal 14s. The DSU (digital service unit) 11 terminates subscriber's loops and the TA 12. The TA 12 converts communication protocols between the DSU 11 and the wireless station 13 in order to connect the wireless terminal 14s with ISDN 2. The wireless station 13 is connected with an output port (R point) of the TA 12 and corresponds to the relay station in the claims of the present invention. The wireless terminal 14 is connected with the wireless station 13 via wireless path and corresponds to the first terminal of the present invention. Further, the illustrated wireless terminal 14 is assumed to be unavailable for accepting callback from other terminal.

Figure 2:
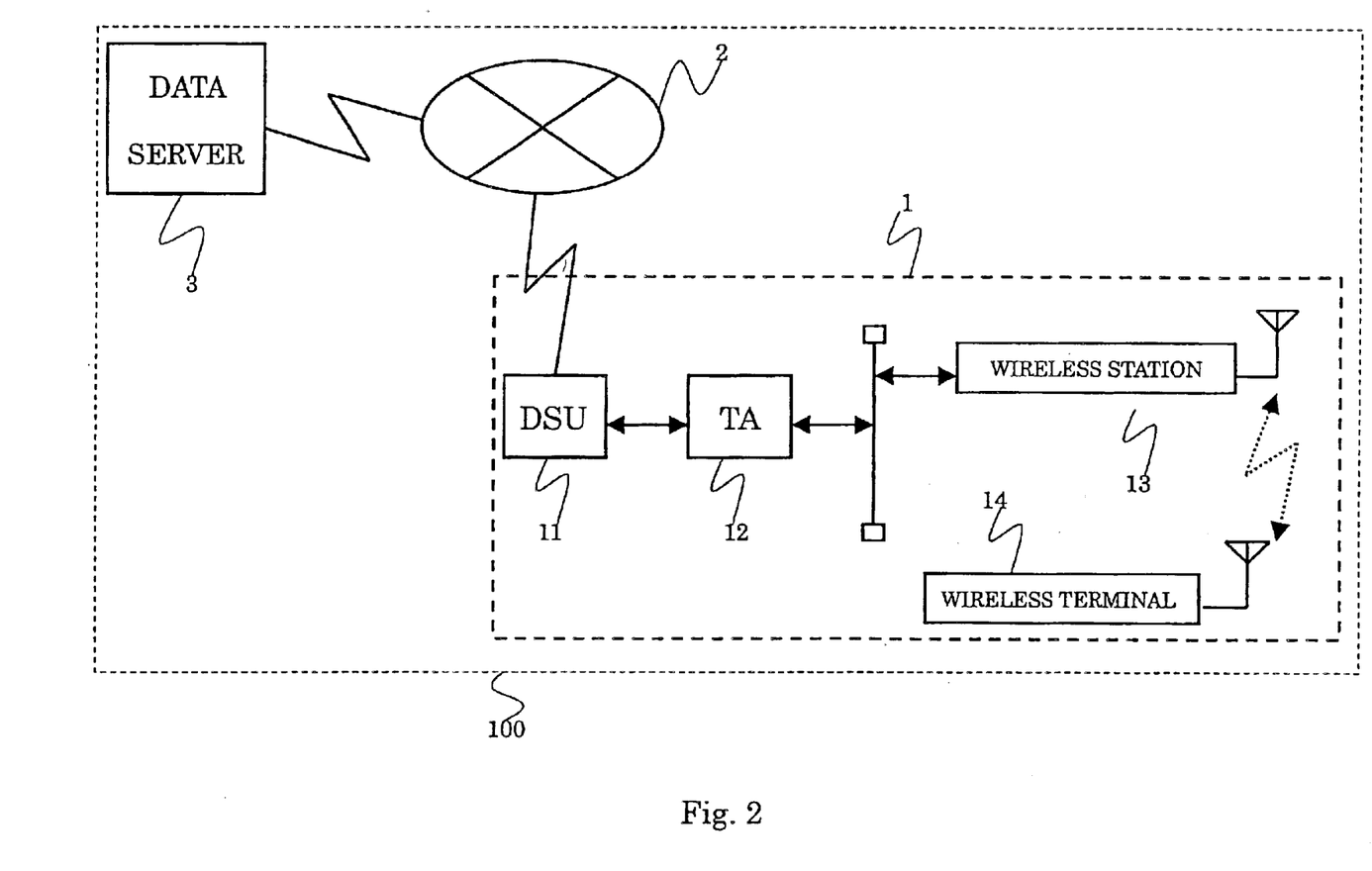
FIG. 2 shows a block diagram of a callback communication system 100 of the present invention.

One wireless terminal 14 is shown in FIG. 2, however, plural wireless terminal 14s are actually connected with the base station 13. The illustrated wireless terminal 14 may be assumed to be PHS telephone equipment having a display device for displaying character data received through callback communication or an interface for outputting character data to another displaying device.

The wireless terminal 14 is common in structure to one another. For example, the wireless terminal 14 comprises a wireless communication unit, an LCD (liquid crystal display), an input unit, a CODEC (coder-decoder), a microphone, a speaker, an LED (light emitting diode), a ringer, a vibrator and so forth. The wireless communication unit executes processes for setting frequency, modulation, demodulation, RSSI (receiving signal strength indication), TDMA (time division multiple access) and TDD (time division duplex) in order to establish wireless connection with a cell station of PHS (not shown in FIG. 2). The input unit comprises a power switch key, a ten key, a function switch key and so forth.

A PSTN (public switched telecommunications network) may be substituted for the ISDN 2. In this case, an NCU (network control unit) or a modem is used instead of the DSU 11.

The data server 3 is connected with the ISDN 2, receives a request for callback communication (hereinafter referred to as callback request) sent from the wireless terminal 14 and sends required data to the wireless terminal 14. For example, the data server 3 may comprise a LAN (local area network) which includes a client/server system and is connected with the ISDN 2 via a DSU and a TA. In this example when the server of the LAN accepts a callback request from the wireless terminal 14, the server sends a callback back to the wireless terminal 14 and, after establishing connection between the server and the wireless terminal 14, serves required data to the wireless terminal 14.

Figure 3:
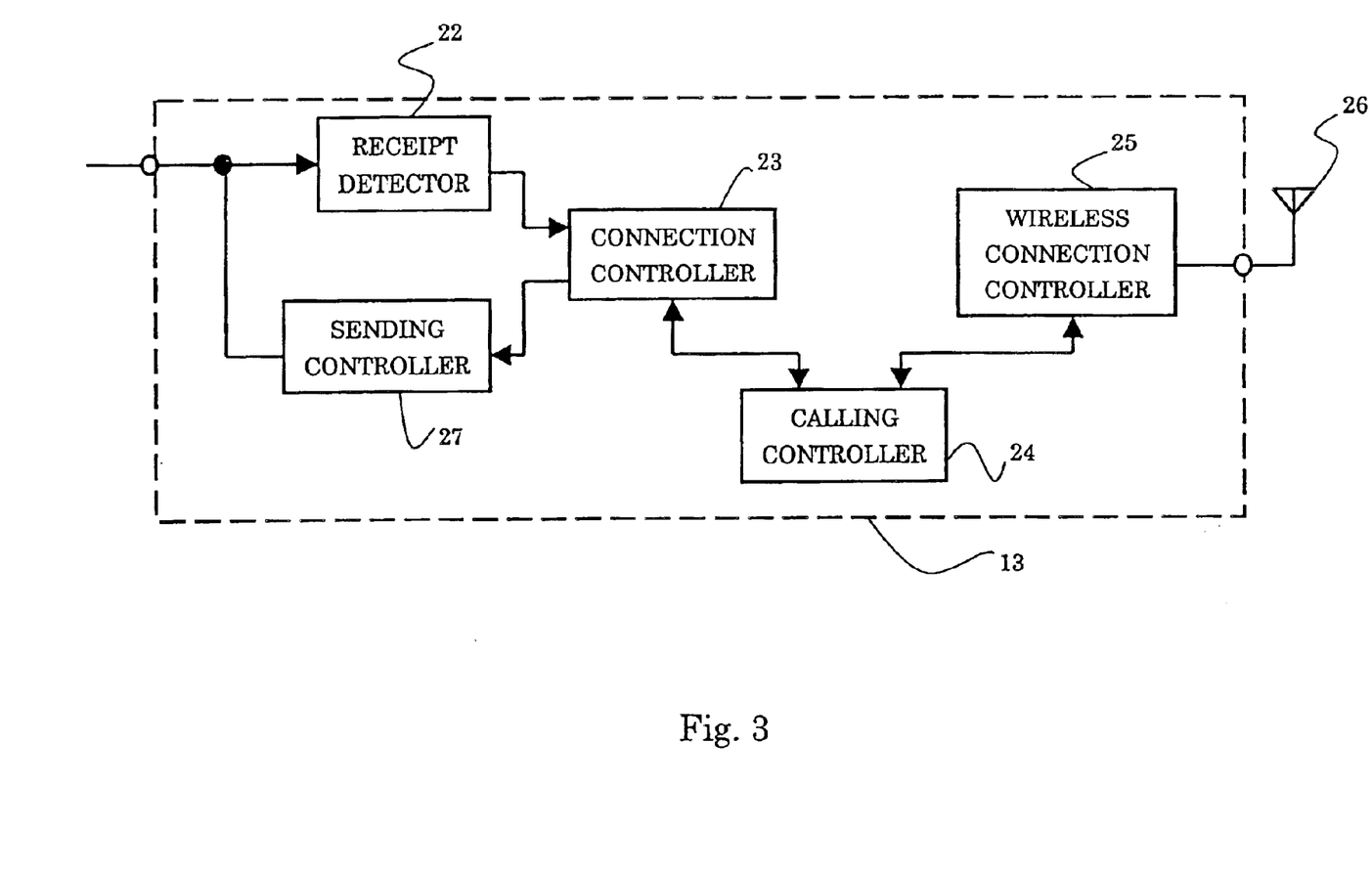
FIG. 3 shows a block diagram of the base station 13.

Turning to FIG. 3, the wireless station 13 comprises a receipt detector 22, a connection controller 23, a calling controller 24, a wireless connection controller 25, an antenna 26 and a sending controller 27. The receipt detector 22 detects receipt of a call via the ISDN 2. The connection controller 23 notifies the calling controller 24 that the receipt detector 22 detects a call. The wireless connection controller 25 controls calling to the wireless terminal 14 according to the calling controller 24. The calling controller 24 decides whether a call detected by the connection controller 23 is a callback sent from the data server 3 or not. The sending controller 27 sends a callback request to the data server 3 via the ISDN 2.

The PBX system 1 is connected with the data server 3 via the ISDN 2. For example, data transmission procedure through information channels (2B)+a control channel (D) or information channels (23B)+a control channel (D) of the ISDN 2 may be regulated in the user network interface standard I. 430 of the I series of ITU-T.

The connection between the wireless station 13 and the wireless terminal 14 may be established according to TDMA/TDD standardized in the RCR-STD-27F, a mobile assisted hand-over procedure and a roaming procedure. Further, the wireless station 13 and the wireless terminal 14 may repeatedly communicate with each other while processing is being executed to register position information of the wireless terminal 14 and to communicate via a control channel CCH or an information channel TCH.

Description will be made about four preferred working processes of the wireless station 13. Hereinafter, connection between the wireless station 13 and the wireless terminal 14 is referred to as first connection, and connection between the data server 3 and the wireless station 13 is referred to as second connection.

(1) When the first connection is established and then the wireless connection controller 25 receives a callback request from the wireless terminal 14, the calling controller 24 directs the connection controller 23 to establish callback connection with the data server 3 while the wireless connection controller 25 is keeping the first connection established. The connection controller 23 directs the sending controller 27 to establish second connection and to send callback request to the data server 3. After sending the callback request, the second connection is interrupted. Then, when the receipt detector 22 detects a call to the wireless station 13 via the ISDN 2, the connection controller 23 decides whether the call is sent from the data server 3 or not. If the call is sent from the data server 3, the receipt detector 22 accepts the call to establish the second connection again. After both the first and the second connections are established, the first and second connections are linked with each other in order to perform data communication between the data server 3 and the wireless terminal 14.

(2) The second connection is once interrupted after the sending controller 27 sends the callback request to the data server 3 in (1). In (2), the second connection is interrupted by the wireless station 13, namely by the connection controller 23.

(3) The second connection once interrupted in (1) is interrupted by the data server 3.

(4) Before the working processes (1), (2) or (3), the wireless station 13 receives a previous notice of sending callback request from the wireless terminal 14. In this case, when the wireless connection controller 25 receives the previous notice from the wireless terminal 14, the first connection is once interrupted. Next, the calling controller 24 directs the connection controller 23 to send the previous notice to the data server 3. The connection controller 23 directs the sending controller 27 to establish the second connection in order to send the previous notice. After sending the previous notice from the sending controller 27 to the data server 3, the second connection is interrupted. In response to the previous notice, when the data server 3 is ready to accept callback request to the wireless terminal 13, the data server 3 send back a ready notice to the wireless station 13. When the receipt detector 22 detects a receipt of the ready notice, the calling controller 24 receives the ready notice via the connection controller 23 and directs the wireless connection controller 25 to send the ready notice to the wireless terminal 14.

Next, description will be made about four processes for establishing callback communication of the callback communication system 100. Following four processes (A), (B), (C) and (D) correspond to the working processes of the wireless station 13 (1), (2), (3) and (4) mentioned above in order.

Figure 4:
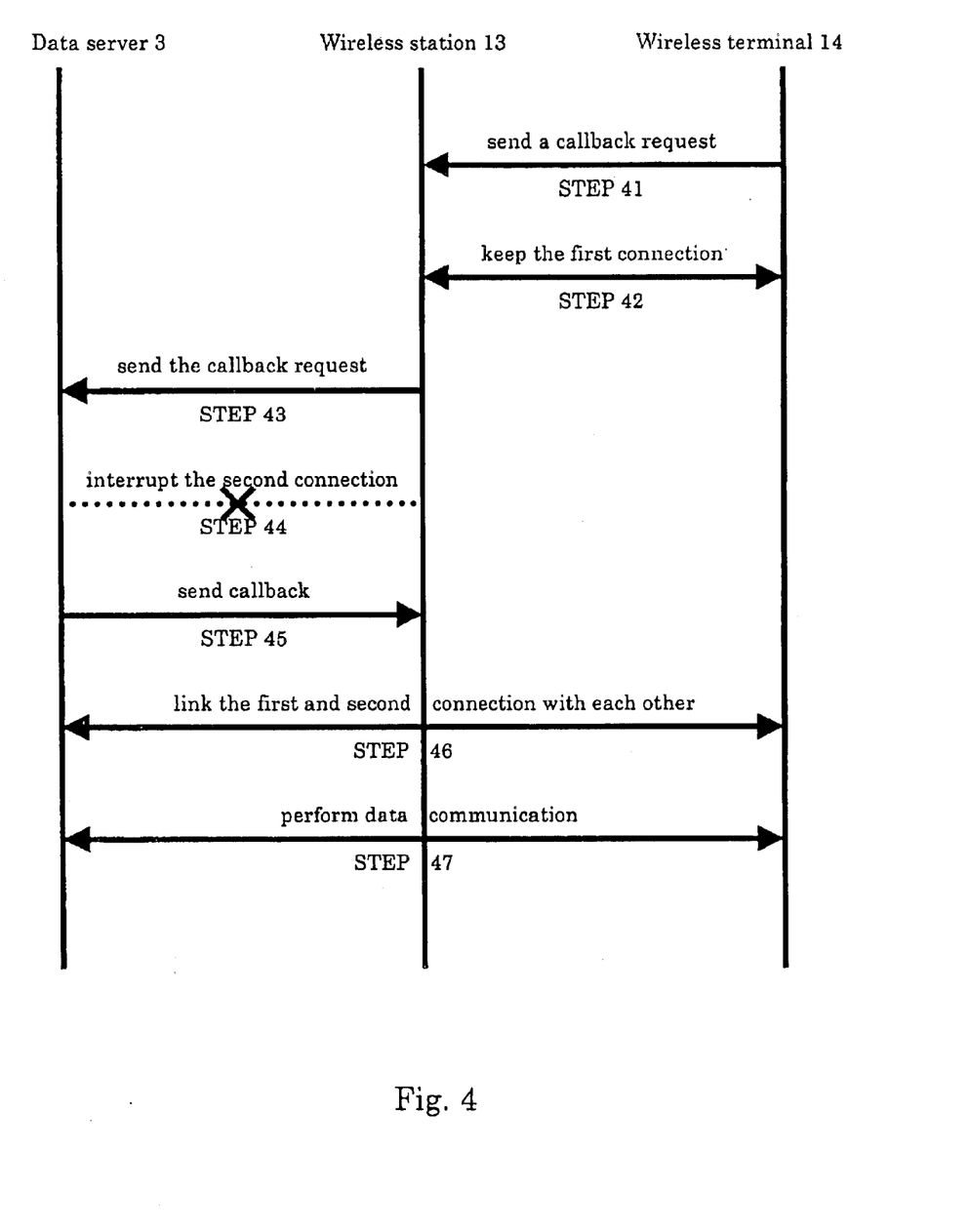
FIG. 4 shows a callback communication sequence of the system shown in FIG. 3.

(A) Turning to FIG. 4, first, the wireless terminal 14 establishes first connection and sends a callback request to the wireless station 13 (STEP 41). Next, the wireless station 13 sends the callback request to the data server 3 with the first connection being kept establishing (STEP 42, 43). Then, the second connection is once interrupted (STEP 44) and the data server 3 establishes the second connection again and sends callback to the wireless station 13 (STEP 45). After that, the wireless station 13 links the first connection with the second connection (STEP 46). Finally, data communication between the wireless terminal 14 and the data server 3 is performed (STEP 47).

Figure 5:
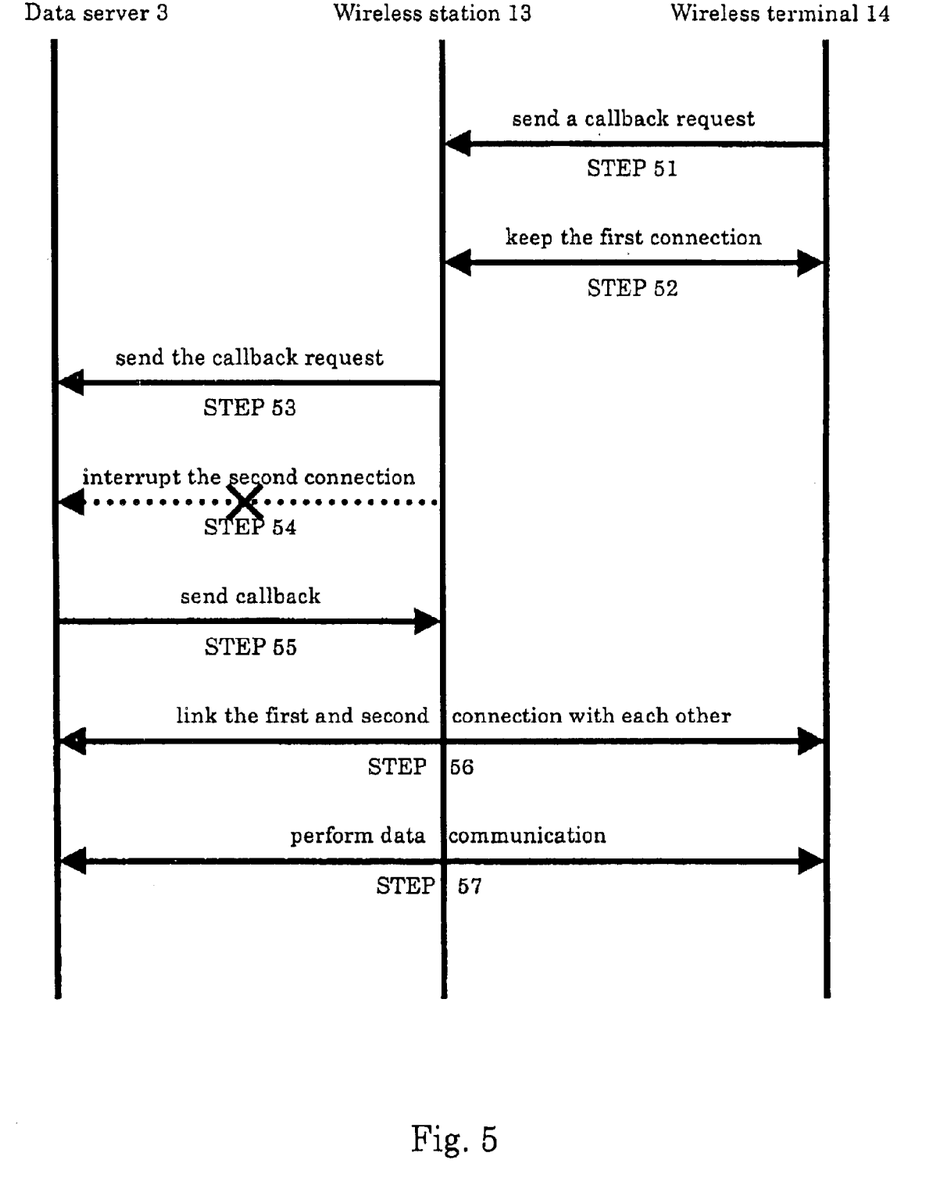
FIG. 5 shows a callback communication sequence of the system shown in FIG. 3.

(B) Turning to FIG. 5, first, the wireless terminal 14 establishes first connection and sends a callback request to the wireless station 13 (STEP 51). Next, the wireless station 13 sends the callback request to the data server 3 with the first connection being kept established (STEP 52, 53). Then, the wireless station 13 interrupts the second connection (STEP 54). Next, the data server 3 establishes the second connection again and sends callback to the wireless station 13 (STEP 55). After that, the wireless station 13 links the first connection with the second connection (STEP 56). Finally, data communication between the wireless terminal 14 and the data server 3 is performed (STEP 57).

Figure 6:
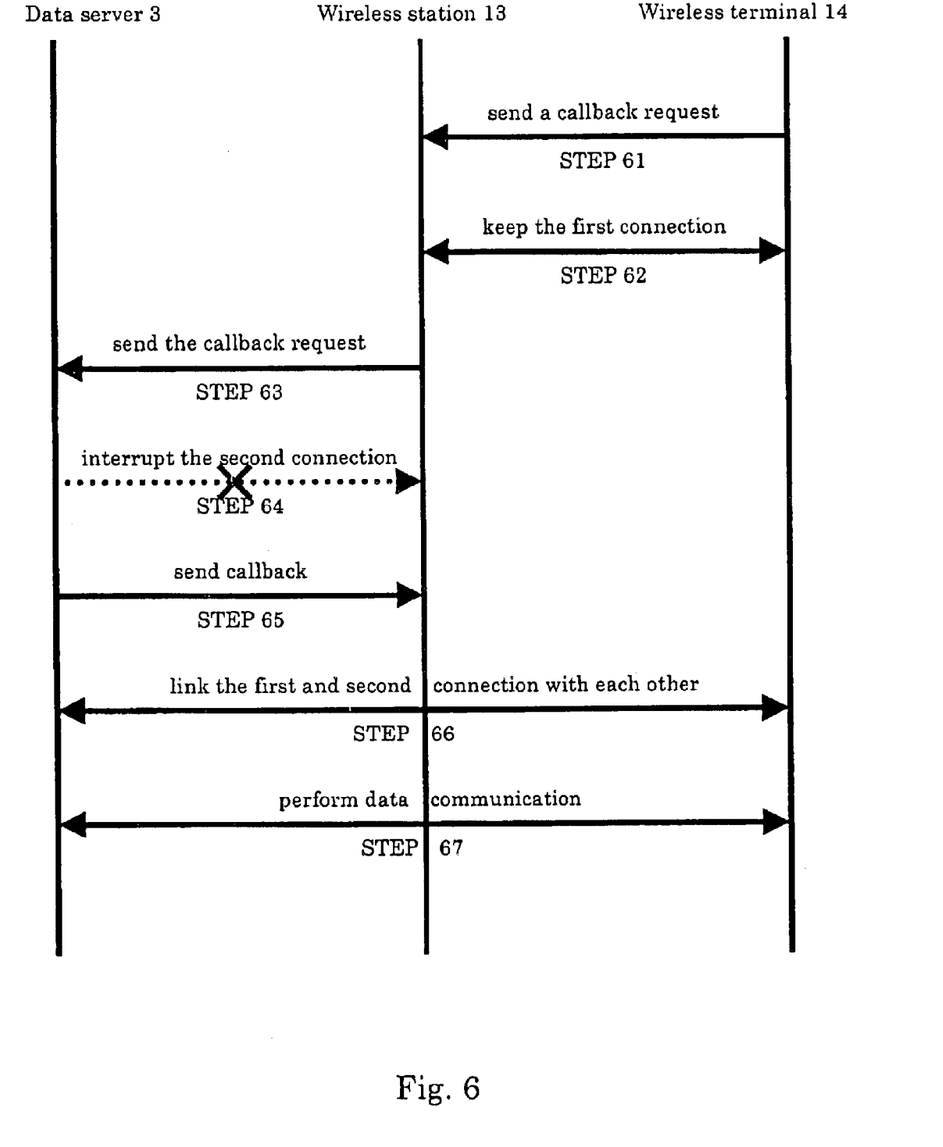
FIG. 6 shows a callback communication sequence of the system shown in FIG. 3.

(C) Turning to FIG. 6, first, the wireless terminal 14 establishes first connection and sends a callback request to the wireless station 13 (STEP 61). Next, the wireless station 13 sends the callback request to the data server 3 with the first connection being kept established (STEP 62, 63). Then, the data server 3 once interrupts the second connection (STEP 64). Next, the data server 3 establishes the second connection again and sends callback to the wireless station 13 (STEP 65). After that, the wireless station 13 links the first connection with the second connection (STEP 66). Finally, data communication between the wireless terminal 14 and the data server 3 is performed (STEP 67).

Figure 7:
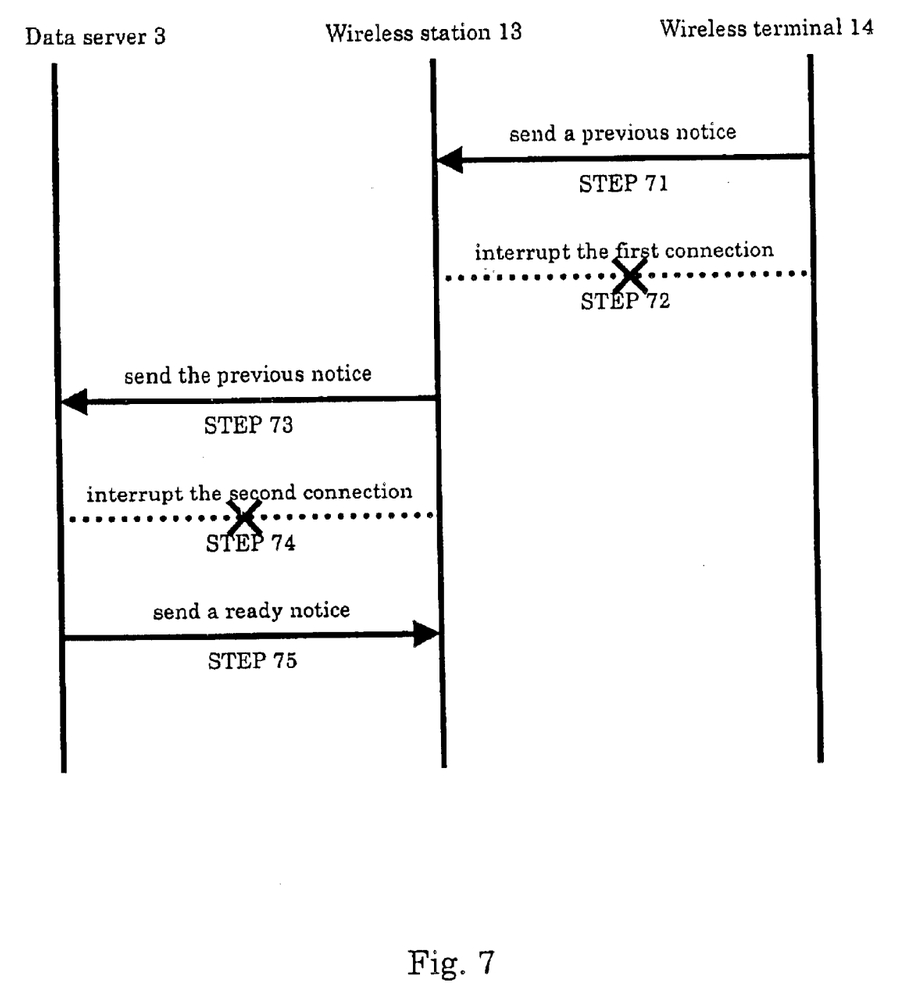
FIG. 7 shows a callback communication sequence of the system shown in FIG. 3.

(D) This process (D) precedes the processes (A), (B) or (C). Turning to FIG. 7, first, the wireless terminal 14 sends to the wireless station 13 a previous notice which announces that the wireless terminal 14 is planning to send a callback request to the data server 3 near the future (STEP 71). Next, the first connection is interrupted (STEP 72). Then, the wireless station 13 sends the previous notice to the data server 3 (STEP 73). Next, the second connection is interrupted (STEP 74). Then, the data server 3 send to the wireless station 13 a ready notice which announces that the data server 3 has been ready for accepting a callback request (STEP S75). After that, one of the processes (A), (B) and (C) follows.

According to the callback communication system 100 mentioned above, the wireless terminal 14 can perform data communication with the data server 3 via the ISDN 2. In this system, the wireless terminal 14 may not comprise a device for accepting callback from the data server 3. Further, even if the wireless station 13 manages plural wireless terminals, the wireless station 13 does not have to identify these terminals each other to send callback to the wireless station having requested the callback.

Furthermore, according to the system 100, connection control sequence of wireless station is simplified. In conventional connection control sequence, both the first and second connections are interrupted after a wireless terminal sends a callback request to a data server. In the embodiment of the present invention, however, the first connection is continuously established during a time from sending a callback request to establishing connection between the wireless terminal 14 and the data server 3.

In above-mentioned processes (A), (B), (C) and (D), callback communication is requested by the wireless terminal 14. On the other hand, callback communication may be requested by the data server 3. Following description is made about a process reverse to the process (A) with reference to FIGS. 2, 3 and 8. The data server 3 sends a callback request to the wireless station 13 via the ISDN 2 (STEP 81). The receipt detector 22 detects a receipt of the callback request and tells the receipt to the connection controller 23. The connection controller 23 recognizes the receipt and requests the calling controller 27 to decide whether the second connection is to be established or not. In response to the request, the calling controller 27 analyzes the receipt to distinguish a receipt of a callback request to the wireless terminal 14 from other receipts. If the receipt is distinguished as a receipt of a callback request, the calling controller 27 directs the wireless connection controller 25 to call the wireless terminal 14. The wireless connection controller 25 calls the wireless terminal 14 (STEP 82).

Figure 8:
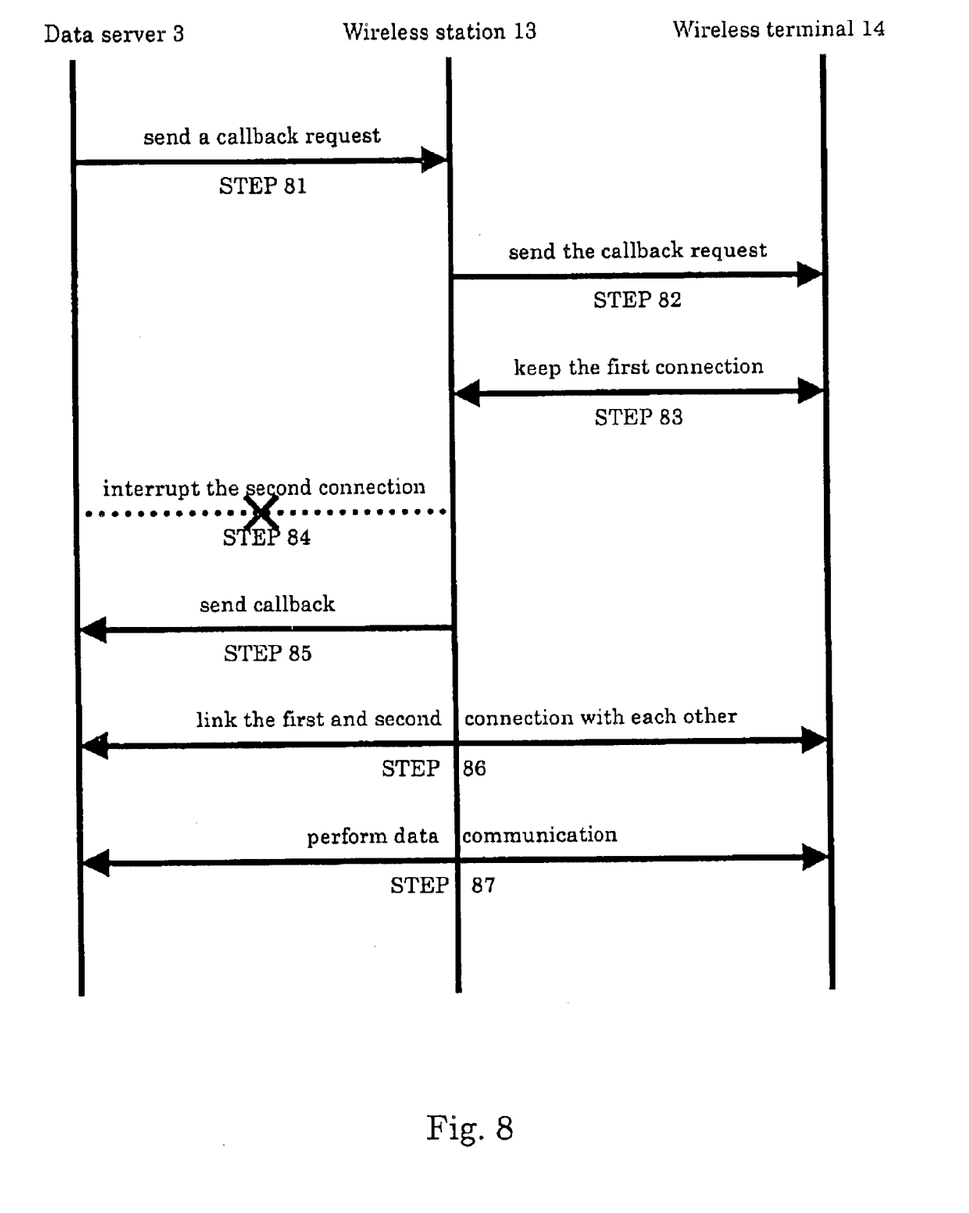
FIG. 8 shows a callback communication sequence of the system shown in FIG. 3.

In response to the call from the wireless connection controller 25, the wireless terminal 14 establishes the first connection (STEP 83).

While the first connection is continuously kept established, the calling controller 27 directs the connection controller 23 to interrupt the second connection. The connection controller 23 interrupts the second connection (STEP 84). The calling controller 27 recognizes that the second connection is interrupted and then the calling controller 27 directs the connection controller 23 to call the data server 3. The connection controller 23 directs the sending controller 27 to call the data server 3. The sending controller 27 calls the data server 3 (STEP 85).

The data server 3 accepts the call and establishes the second connection again. The reestablishment of the second connection detected by the sending controller 27 is announced to the calling controller 24 via the connection controller 23. Then, the calling controller 27 links the first connection with the second connection (STEP 86). Consequently, data communication between the data server 3 and the wireless terminal 14 is performed (STEP 87).

Figure 9:
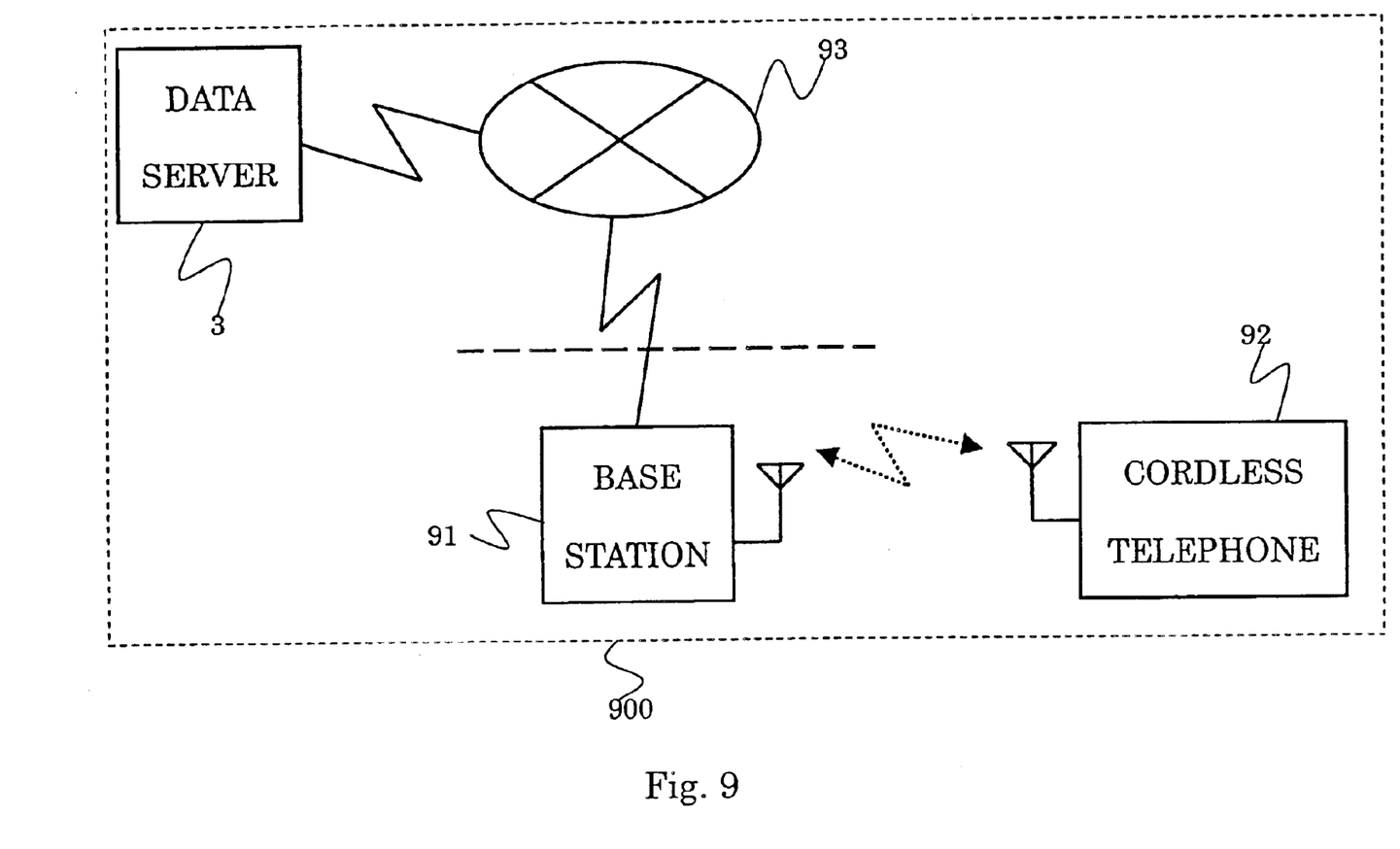
FIG. 9 shows a block diagram of a callback communication system of the present invention.

If the wireless terminal 14 is busy at STEP 82, the wireless station 13 announces that and cancels the callback request If the data server 3 is busy at STEP 85, the wireless station 13 interrupts the first connection and cancels the callback request The present invention is applicable for various communication systems. For example, the present invention is applied to the callback communication system 900 shown in FIG. 9. In the system 900, the base station 91 corresponds to the DSU 11, the TA 12 and the wireless station 13. The cordless telephone 92 corresponds to the wireless terminal 14. Both wireless and wired connections are available for connection between the public telecommunication network 93 and the base station 91.

Furthermore, the present invention is applicable not only to a relay station of a private branch exchange system, but also to an exchange of a switched network. For example, a micro cell station of PHS may correspond to the wireless station 13. In this case, mobile assisted hand off between adjacent micro cells or roaming between two PHS communication networks allows callback communication through wide area to be performed.

Figure 10:
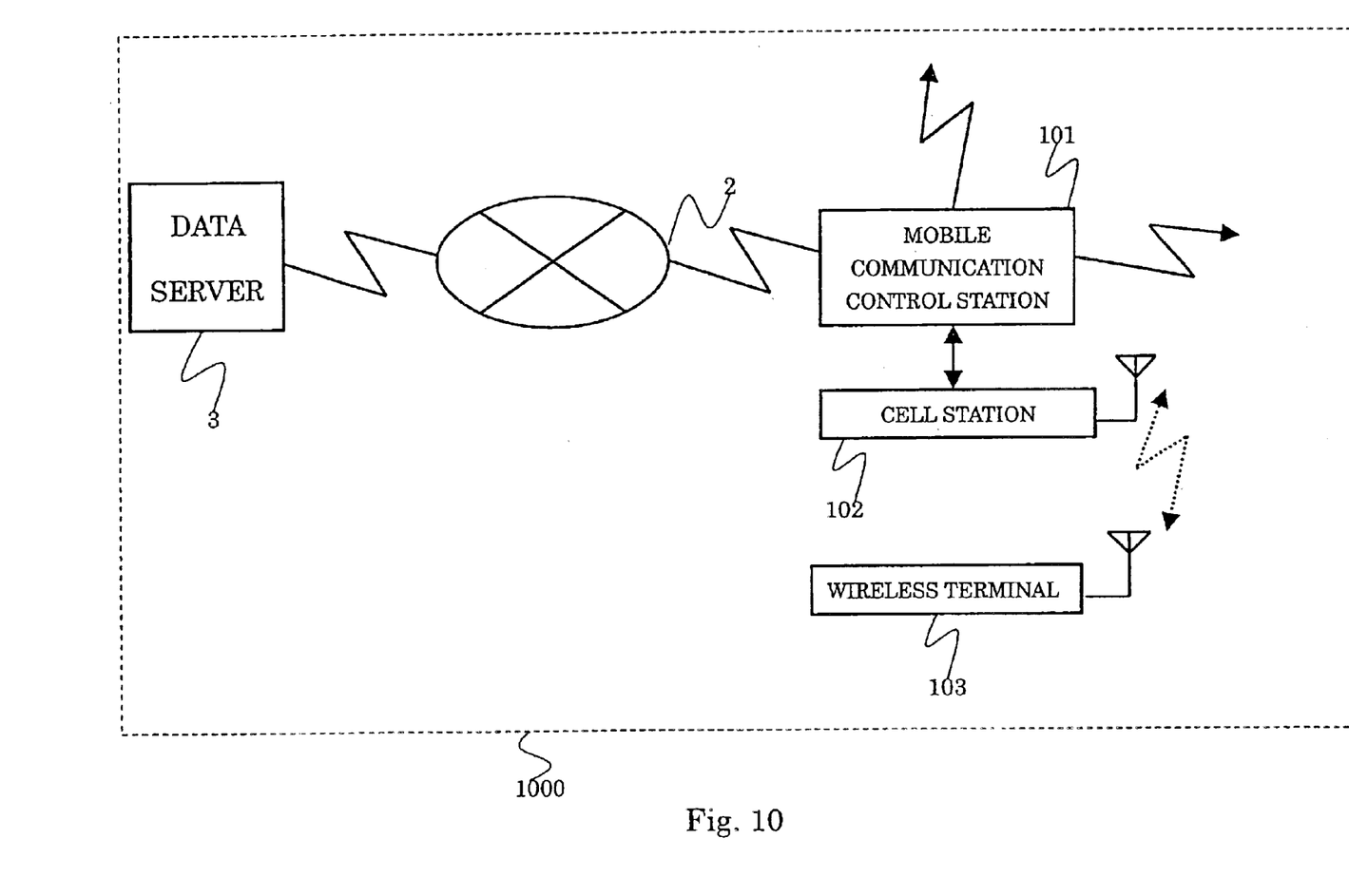
FIG. 10 shows a block diagram of a callback communication system of the present invention.

The present invention is also applicable to the callback communication system 1000 as shown in FIG. 10. The system 1000 is based on PDC and TDMA (time division multiple access). The mobile communication control station 101 manages plural cell station 102s. In this case, the wireless station 13 is incorporated into the cell station 102.

Moreover, above-mentioned processes are applicable to a callback communication system whose relay station and terminal are connected with each other via wired line. In the system, a relay station and terminals that are connected with each other via wired line are substitutive for the wireless station 13 and the wireless terminal 14s. In this case, the terminal may not be incorporated with a unit for accepting callback autonomously. Moreover, the present invention is also applicable to communication systems based on TCP/IP, PIAFS (PHS internet access forum standard), the Internet, intranet or extranet The present invention is independent on type of multiple access of applied communication system. For example, PHS-TDMA/TDD. PDC-TDMA, CDMA (code division multiple access) or FDMA (frequency division multiple access) are available for multiple access of the communication system.

As mentioned above, the present invention can provide a method and a relay station for callback communication whose terminal may not be incorporated with a device for accepting callback from the data server. Because connection between the relay station and the terminal is being kept established from sending a callback request until establishing connection between the terminal and the data server.

Moreover, according to the present invention, requested callback is established in higher probability than that of the conventional. Because connection between the relay station and the terminal is secured until requested callback is sent back to the relay station.

And moreover, according to the present invention, connection control procedure by the relay station becomes very simple. This is because the conventional relay station has to reserve a path for the terminal requesting callback.

While this invention has thus far been described in conjunction with a few embodiments thereof, it will be readily possible for those skilled in the art to put the this invention into various other manners.

What is claimed is:

1. A method of establishing callback communication between first and second terminals via a relay station, the first terminal sending a callback request for establishing the callback communication to the second terminal, comprising the steps of:
   (1) establishing first connection between the first terminal and the relay station;
   (2) sending the callback request from the first terminal to the relay station;
   (3) establishing second connection between the second terminal and the relay station with the first connection being kept established in response to a request from the second terminal;
   (4) sending a callback request from the relay station to the second terminal;
   (5) interrupting the second connection;
   (6) re-establishing the second connection from the second terminal to the relay station; and
   (7) linking the first connection with the second connection in order to establish the callback communication between the first and second terminals.

2. The method claimed in claim 1, wherein:
   the relay station comprises wireless and wired communication interfaces; and
   the wireless communication interface is connected with at least one of the first and second terminals.

3. The method claimed in claim 1, the step 3 comprising the steps of:

establishing the second connection requested by the relay station;

sending the callback request from the relay station to the second terminal;

canceling the second connection; and establishing the second connection requested by the second terminal.

4. The method claimed in claim 3, wherein the step of canceling is requested by the relay station.

5. The method claimed in claim 3, wherein the step of canceling is requested by the second terminal.

6. The method claimed in claim 2, wherein:

the first terminal is connected with the relay station via the wireless communication interface; and the second terminal is connected with the relay station via the public telecommunication network.

7. The method claimed in claim 2, wherein:

the first terminal is connected with the relay station via the public telecommunication network; and the second terminal is connected with the relay station via the wireless communication interface.

8. A relay station for establishing callback communication between first and second terminals, the first terminal sending a callback request for establishing the callback communication to the second terminal, comprising:

first interface for establishing first connection with the first terminal and receiving the callback request from the first terminal;

second interface for establishing second connection with the second terminal while the first connection is being kept established in response to a request from the second terminal, sending a callback request to the second terminal, interrupting the second connection, and re-establishing the second connection from the second terminal; and means for linking the first connection with the second connection in order to establish the callback communication between the first and second terminals.

9. The relay station claimed in claim 8, comprising wireless and wired communication interface, the wireless communication interface being connected with at least one of the first and second terminals.

10. The relay station claimed in claim 8, the second interface comprising means for canceling the second connection from sending the callback request to the second terminal to receiving a request for reestablishing the second connection from the second terminal.

11. The relay station claimed in claim 10, wherein the means for canceling cancels the second connection without waiting for a request from the second terminal.

12. The relay station claimed in claim 10, wherein the means for canceling cancels the second connection in response to a request from the second terminal.

13. The relay station claimed in claim 9, the first terminal being connected with the relay station via the wireless communication interface, the second terminal being connected with the relay station via the public telecommunication network.

14. The relay station claimed in claim 9, the first terminal being connected with the relay station via the public telecommunication network, the second terminal being connected with the relay station via the wireless communication interface.

* * * * *